(12) United States Patent
Rossnagel

(10) Patent No.: US 8,353,745 B1
(45) Date of Patent: Jan. 15, 2013

(54) POLYCARBONATE SUPPORT FOR DUCTS

(76) Inventor: Bryan Rossnagel, Houston, TX (US)

( * ) Notice: Subject to any disclaimer, the term of this patent is extended or adjusted under 35 U.S.C. 154(b) by 1396 days.

(21) Appl. No.: 11/956,046

(22) Filed: Dec. 13, 2007

(51) Int. Cl.
*F16L 35/00* (2006.01)

(52) U.S. Cl. ......... 454/65; 454/903; 285/24; 248/316.1; 248/75; 248/74.3

(58) Field of Classification Search .............. 454/65, 454/903; 285/24; 248/316.1, 75, 74.3
See application file for complete search history.

(56) References Cited

U.S. PATENT DOCUMENTS

| | | | | |
|---|---|---|---|---|
| 2,775,927 A | * | 1/1957 | Wulle | 454/298 |
| 2,864,406 A | * | 12/1958 | Schewel | 239/505 |
| 4,735,235 A | * | 4/1988 | Anderson et al. | 138/109 |
| 4,889,168 A | * | 12/1989 | Kerzich et al. | 138/103 |
| 5,219,403 A | * | 6/1993 | Murphy | 137/561 A |
| 5,322,470 A | * | 6/1994 | Vartiainen et al. | 454/49 |
| 5,769,702 A | * | 6/1998 | Hanson | 454/63 |
| 6,840,356 B2 | * | 1/2005 | Nishiyama | 188/306 |
| 6,932,105 B1 | * | 8/2005 | Ward | 137/338 |
| 7,104,881 B1 | * | 9/2006 | Hyslop | 454/63 |
| 8,038,175 B2 | * | 10/2011 | Crook | 285/24 |
| 2009/0208271 A1 | * | 8/2009 | Krohn | 403/4 |
| 2010/0066082 A1 | * | 3/2010 | Aubert et al. | 285/408 |

* cited by examiner

*Primary Examiner* — John K Fristoe, Jr.
*Assistant Examiner* — Daphne M Barry
(74) *Attorney, Agent, or Firm* — Egbert Law Offices, PLLC

(57) ABSTRACT

An apparatus for the extraction of gases has a flexible duct with an interior therein, a polymeric support extending in the interior of the flexible duct, a first anchor that secures an end of the polymeric support, a second anchor that secures an end of the flexible duct, and a duct connector. The first anchor secures the end of the polymeric support to the duct connector. The second anchor secures the end of the flexible duct to the duct connector. The polymeric support is elongated. The polymeric support has a taper and a thickness suitable for holding the flexible duct in a fixed position. The polymeric support is formed of a polycarbonate material.

12 Claims, 4 Drawing Sheets

POLYCARBONATE SUPPORT FOR DUCTS

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to the extraction of gases and gas particulates. More particularly, the present invention the relates to flexible ducts for removing or extracting gases from a given area. More particularly still, the present invention the relates to flexible ducts having supports for positioning the ducts. More particularly still, the present invention the relates to flexible ducts having internal supports.

2. Description of Related Art Including Information Disclosed Under 37 CFR 1.97 and 37 CFR 1.98.

Hoses, ducts, and conduits in various sizes and configurations are commonly utilized for conveying, routing, and directing various substances and objects. For example, many factories use machines and equipment in welding which create unhealthy gases, fumes, or vapors which must be immediately extracted from the building. Those in need of extracting harmful gases from a building usually use flexible ducts to do so. The flexible ducts are connected to some kind of suction source that removes the harmful gases from the area.

Ducts are made to be flexible so that the position of the duct opening can be changed so as to optimally extract harmful gases from the area. In the past, it has been quite a challenge to keep a flexible duct in a fixed position. Prior art has attempted to remedy the problem of fixedly positioning a flexible duct by adding support arms. Theses support arms are either located inside the duct or outside the duct.

For example, U.S. Pat. Nos. 6,503,139, issued on Jan. 7, 2003 to Coral, describes an external duct support on a conduit that includes a rotary fitting, in two segments, elbow-connected to each other. Each of the segments has an articulate mechanism that includes a pair of U-section bars connected to each other in the form of an articulated parallelogram by means of two articulated elements. A spiral compression spring is housed between each pair of bars and is compressed between a disk that is integral with one of the bars and a flange that slides along a threaded rod. The flange is locked on the rod by means of a nut. The rod is connected to a lever member pivoting on one of the articulated elements so as to adjust the action of the spring as a function of the angular position of the relative segment with respect to the articulated element.

U.S. Pat. No. 5,536,206, issued on Jul. 16, 1996 to Bodmer et al., describes an external duct support adapted for concentrated sources of fumes and particulate matter that includes an elongated duct connected at one end to a vacuum source and adapted to be supported by a wall bracket or a portable console and a fume collection hood at the opposite end of the duct. One or more flexible joints are interposed in the duct between the support bracket and the hood. Joint support mechanisms for each flexible joint include opposed pairs of pivotally connected arms which interconnect rigid sections of duct on each side of the flexible joint. The connections between the arms of each set include a friction clutch and a ratchet-and-pawl mechanism which permits free movement of the flexible joints in a direction which is opposite that which the hood would move under its own weight while providing for counterbalancing the weight of the apparatus distal of the support bracket and a positive force required to position the hood precisely in the other direction. The friction clutch and ratchet-and-pawl mechanism is interposed between the arms of each set of arms about a pivot connection formed by a bolt and nut assembly, which may be adjusted to change the friction force required to slip the clutches of each joint support mechanism.

U.S. Pat. No. 6,354,937, issued on Mar. 12, 2002 to Crook, describes a sleeve assembly for supporting flexible duct. The assembly includes a frame with first and second frame sections. The frame sections are secured together by fastener subassemblies. The sleeve assembly accommodates flexible duct in various angular and straight configurations. The frame can comprise various suitable materials and skeletal or solid-exterior construction. The sleeve assembly is adapted for various installations in air distribution systems of heating, ventilating and air conditioning systems.

U.S. Pat. No. 2,810,400, issued on Oct. 22, 1957 to Hewitt et al., describes the wrapping of a flexible wire around the exterior of the duct. The wire is wound around the exterior of the duct in a spiral fashion. Material strips join each of the wires in an overlapped arrangement.

U.S. Pat. No. 2,804,095, issued on Aug. 27, 1957 to Schauenburg, describes an air duct whereby the duct is supported between a pair of longitudinal rods. Clamps are provided over the exterior of the surface of ducts so as to join with the rods for supporting the ducts in a desired configuration.

While these external supports for ducts have served a certain function, they have created the problem of being bulky and cumbersome. The supporting parts of these external supports are exposed to dust and to particulate matter in the air which causes the parts to get dirty and malfunction.

As a way to avoid the shortcomings of external supports for duct, the prior art has attempted to place the supporting members inside the ducts. For example, U.S. Pat. No. 3,818,817, issued on Jun. 25, 1974 to Nederman, describes an apparatus for removing noxious gases from a work area that has internal support areas. The apparatus comprises a suction fan, a flexible tubing connected to the suction part of the fan, a suction casing mounted at the tube end and provided within the tube, a lever system which consists of two lever arms of which one arm at one end is connected to the suction part of the fan and at the other end is connected to one end of the other arm, which is further connected to the suction casing.

U.S. Pat. No. 5,482,505, issued on Jan. 9, 1986 to Hedlund, describes an arrangement for the extraction of harmful gases from workplaces that has an internal support for the duct. The arrangement has a carrier arm system that has at least two arms connected telescopically with each other so that the carrier arm system can be given different lengths, whereby the carrier arm system is swiveable around a horizontal spindle so that it can be swivelled in a vertical direction and placed in different positions between a downward-directed, preferably substantially vertical, end position and an outward-directed, preferably substantially horizontal, end position. In order to permit the necessary balancing of both the swivelling and positioning of the carrier arm system and the telescoping function of the arms of the carrier arm system when the carrier arm system is swivelled within a large sector, at least one first device is arranged to generate balancing forces in order to facilitate swivelling of the carrier arm system in the vertical direction between the end positions and/or to facilitate the retention of the carrier arm system in set positions between the end positions. At least one second device is arranged to generate balancing forces which allow the arms of the carrier arm system to remain in the positions relative to each other that they were given by the telescopic function, at least when the carrier arm system is directed substantially downwards.

U.S. Pat. No. 5,738,148, issued on Apr. 14, 1998 to Coral et al., describes a hose with external supports comprising two flexible portions connected respectively to the suction unit and to the fume-conveyor element or hood, and a rectilinear portion which is articulated to the suction unit and the hood. The rectilinear portion comprises two rigid tubes between which is disposed an extensible bellows-type tube. Rigid tubes are held co-axial by a pair of rectilinear guides fixed to one of the rigid tubes and slidably engaging on a pair of fixed slides on the other rigid tube. The two rigid tubes are, finally, connected by a tension spring the action of which is braked by two friction disks disposed between the guides and the slides.

U.S. Pat. No. 5,527,217, issued on Jun. 18, 1996 to Engstrom, describes an adjustable device for exhaustion and/or supply of gases and gas-supported particles that has internal supporting members for the duct. The device comprises at least one exhaustion and/or supply conduit which is pivotable in at least a vertical direction, whereby at least one force-producing balancing device is provided for balancing the exhaustion and/or supply conduit. In order to provide at such an adjustable device that the balancing device generates balancing forces which correspond with the correct balancing requirement, the force-producing balancing device cooperates with a compensating device which compensates for the differences between the balancing force that the force-producing balancing device exerts on the exhaustion and/or supply conduit and the force required for balancing the exhaustion and/or supply conduit in substantially all its positions.

U.S. Pat. No. 5,499,946, issued on Mar. 19, 1996 to Valkering, describes a device for exhausting gases or the like that has internal support members. The internal support members comprise a support and at least one exhaustion tube movably mounted to the support and having a frame which is connected to the support in a manner pivotable at least in vertical direction. The frame is provided with a balancing mechanism for the exhaustion tube. The balancing mechanism comprises a cable with a draw spring. The cable is guided between the support and the frame such that there are formed at least two cable portions to create two force components producing an opposite variable torque around the pivot point of the frame such that the balancing torques, counteracting the gravitational torque, are produced.

U.S. Pat. No. 6,604,549, issued on Aug. 12, 2003 to Gaughier et al., describes a device for fixing a tubular element in a cavity. This device is made up of hoops made of an elastically flexible material disposed in cross-sectional planes of the cavity. The device is characterized in that, along the longitudinal axis of the cavity, the hoops are secured together by a flexible longitudinal support and are interconnected by a flexible membrane.

U.S. Pat. No. 3,716,077, issued on Feb. 13, 1973 to Sherman et al., describes a flexible insulated air duct formed by wrapping blanket insulation about a helically wound wire-like elongate tubular skeleton wherein the opposite ends of the helical windings are closed wound and secured together to form rigid collars of different diameters to define male and female connections whereby sections of such duct may be axially connected on to another.

All of these prior art internal support ducts have a common problem, i.e., that the internal support members obstruct the flow of air and also collect dust over time, further obstructing the flow of air through the duct. This is especially true when the internal support mechanisms are cumbersome and bulky.

There is a need for a flexible duct support that is less cumbersome and bulky. Moreover, there is a need for a flexible duct support that is lightweight, easy to manufacture, and inexpensive. Furthermore, there is a need for an internal flexible duct support that minimizes the restriction of air flow.

It is an object of the present invention to provide a support for a flexible duct that connects to air systems.

It is another object of the present invention to provide a support for a flexible duct that maintains the flexible duct in its desired location in a manner that is convenient to the operator.

It is yet another object of the present invention to provide a support for a flexible duct that is lightweight.

It is another object of the present invention to provide a support for a flexible duct that minimizes the flow obstruction and turbulence of gases traveling through the interior of a flexible duct.

It is another object of the present invention to provide a support for a flexible duct that serves to reduce the suction power required by the vacuum system.

It is another object of the present invention to provide a support for a flexible duct that accommodates the many types of hoses, ducts and conduits.

It is yet another object of the present invention to provide a support for a flexible duct that is formed so as to accommodate any size and diameter of flexible duct.

These and other objects and advantages of the present invention will become apparent from a reading of the attached specification and appended claims.

BRIEF SUMMARY OF THE INVENTION

The present invention is an apparatus for the extraction of gases comprising a flexible duct having an interior therein, a polymeric support extending in the interior of the flexible duct, a first anchoring means for securing an end of the polymeric support, a second anchoring means for securing an end of the flexible duct, and a duct connector. The first anchoring means secures an end of the polymeric support to the duct connector, and the second anchoring means secures the end of the flexible duct to the duct connector.

The polymeric support is elongated. The polymeric support has a taper and a thickness suitable for holding the flexible duct in a fixed position. The polymeric support, specifically, is of a polycarbonate material. The polymeric support exerts a retaining force on the interior of the flexible duct so as to hold the flexible duct in a fixed position. The end of the polymeric support at the duct connector is wider than an opposite end thereof. The duct connector has an outer diameter less than the inner diameter of the flexible duct.

DETAILED DESCRIPTION OF THE INVENTION

Figure 1:
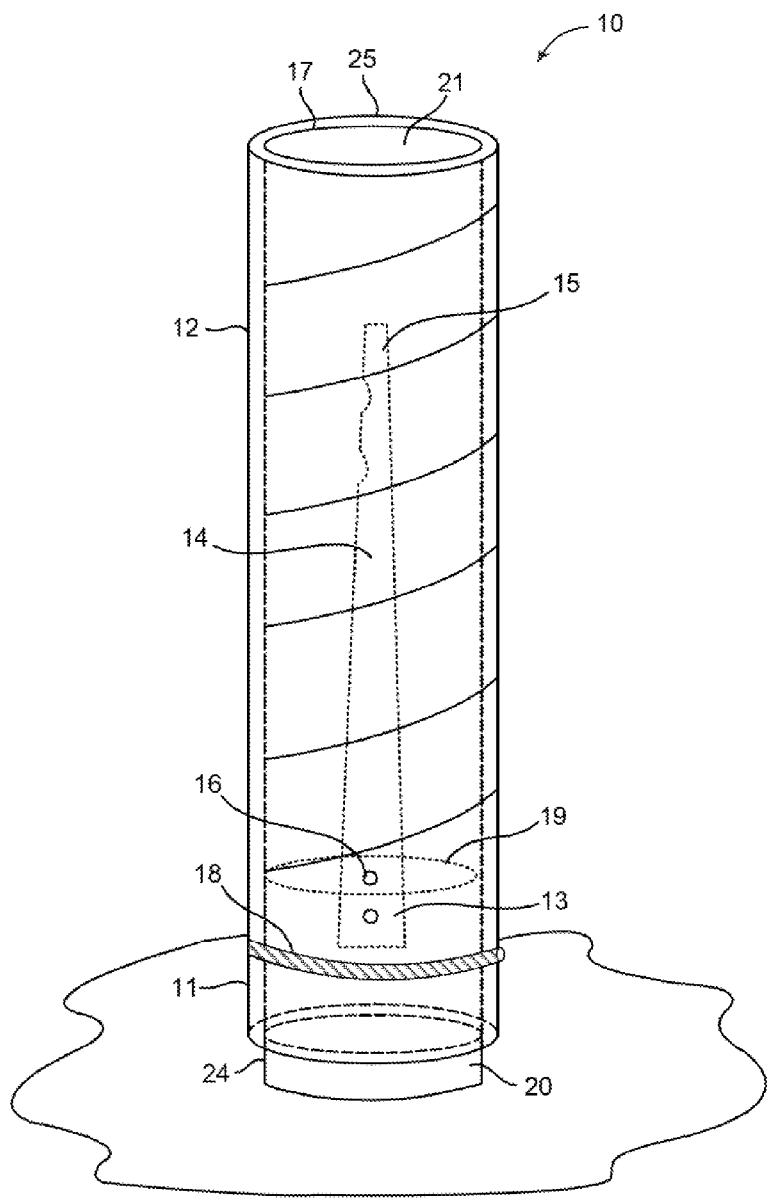
FIG. 1 shows a side elevational view of the apparatus of the present invention, with the flexible duct shown as transparent and in an upright position.

Referring to FIG. 1, there is shown the apparatus 10 of the present invention having a flexible duct 12, a polymeric support 14, a first anchoring means 16, a second anchoring means 18 and a duct connector 20. The flexible duct 12 has an end 11 fitting over the duct connector 20. The flexible duct 12 also has an interior 21 and an inner wall 17. As can be seen in FIG. 1, the flexible duct 12 is generally tubular in shape and has an annular cross-section.

The duct connector 20 is also generally cylindrical in shape. The duct connector 20 can extend from a filter housing, a wall, or any other appropriate surface for suction of gas and particulate matter out of an area. The outer surface 24 of the duct connector 20 is adjacent to the inner wall 17 of the flexible duct 12. The flexible duct 12 is secured to the duct connector 20 by the second anchoring means 18, which in the preferred embodiment, is a ring clamp. In this way, the flexible duct 12 can be bent horizontal and vertically as desired while the end 11 of the flexible duct 12 stays secured to the duct connector 20 because of the second anchoring means 18.

The polymeric support 14 extends within the interior 21 of the flexible duct 12. The polymeric support 14 abuts an inner surface 19 of the duct connector 20. The polymeric support 14 is secured to the inner surface 19 of the duct connector 20 by the first anchoring means 16. In the preferred embodiment, the first anchoring means can be bolts or screws or other fasteners that can suitably secure the polymeric support 14 to the duct connector 20. As can be seen in FIG. 1, it is the end 13 of the polymeric support 14 that is secured to the duct connector 20 by the first anchoring means 16. The opposite end 15 of the polymeric support 14 extends within the interior 21 of the flexible duct 12 and terminates inwardly of the opposite end 25 of the flexible duct 12.

Figure 2:
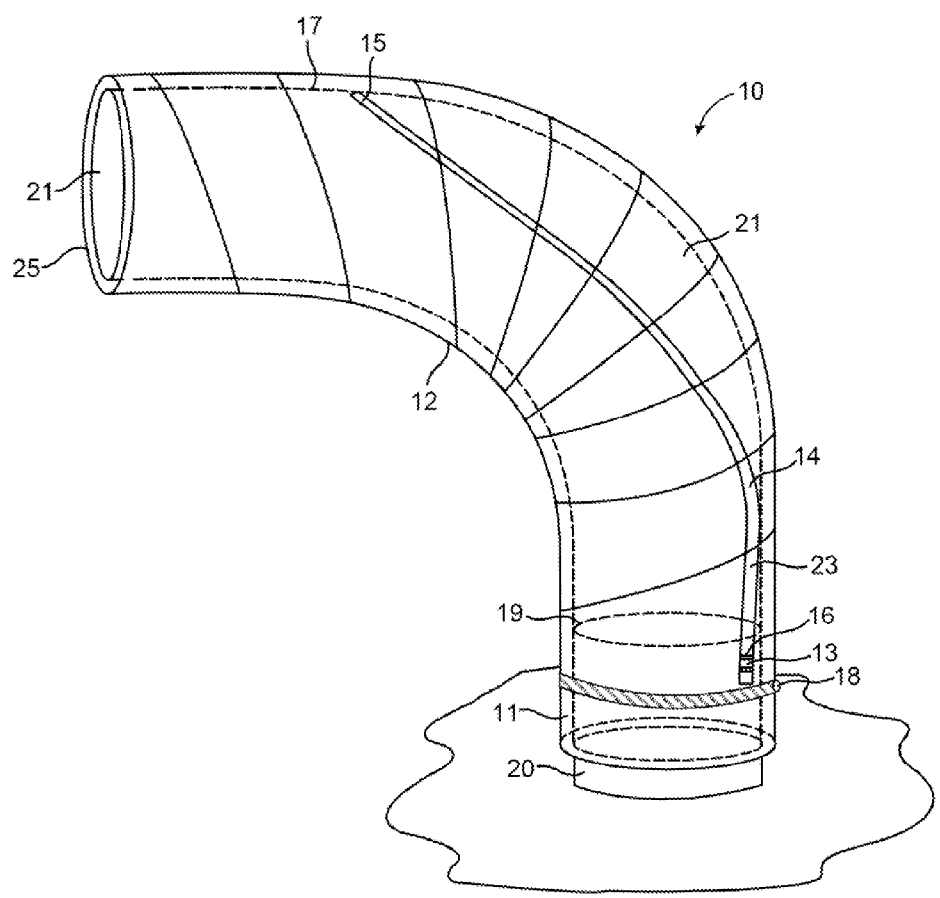
FIG. 2 shows a side elevational view of the apparatus of the present invention with the flexible duct in a bent position.

Referring to FIG. 2, there is shown the apparatus 10 of the present invention with the flexible duct 12 in a bent position. The second anchoring means 18 holds the flexible duct 12 to the duct connector 20. As in FIG. 1, the polymeric support 14 abuts the inner surface 19 of the duct connector 20, and is secured to the inner surface 19 of the duct connector 20 by first anchoring means 16. When the flexible duct 12 is in the bent position, the polymeric support 14 extends upwardly along the inner wall 17 of the flexible duct 12. However, because of the bent orientation of the flexible duct 12, the polymeric support 14 begins to extend within the interior of the flexible duct 12 until it again touches the inner wall 17 of the flexible duct 12 adjacent the opposite end 15 of the polymeric support 14.

In the preferred embodiment, the polymeric support 14 is of a polycarbonate material. Polycarbonate is used because it has a suitable resiliency for balancing the weight of a flexible duct 12. The weight of the opposite end of the flexible duct 12 is counterbalanced by the resilient force of the opposite end 15 of the polymeric support 14. As can be seen, the counterbalance force of the opposite end of the polymeric support 14 is on the inner wall 17 of the flexible duct 12 near the opposite end 25 of the flexible duct 12.

Referring still to FIG. 2, it can be seen that the polymeric support 14 uses very little space in the interior 21 of the flexible duct 12. The polymeric support 14 is very thin and, as such, does not impede air flow. As a result, the polymeric support 14 is less likely to capture dust and less likely impede the flow of gases through the flexible duct 12. Additionally, flow of gases through the flexible duct 12 will be less turbulent than other types of supporting devices that are more cumbersome and bulky within the interior 21 of the flexible duct 12. As a result, power requirements and vacuum forces are less than would be required by other systems.

As the flexible duct 12 is bent into position by an operator, the opposite end 15 of the polymeric support 14 travels along the inner wall 17 of the flexible duct 12. Thus, the opposite end 15 of the polymeric support 14 can reside simply within the interior 21 of the flexible duct 12 without touching the inner wall 17 when the flexible duct 12 is in the upright position, or the opposite end 15 of the polymeric support 14 will travel along the inner wall 17 of the flexible duct 12 toward the opposite end 25 of the flexible duct 12 when the flexible duct 12 is bent.

The present invention also works when the flexible duct 12 extends from a horizontally-positioned duct connector 20. In this situation, the flexible duct 12 and polymeric support 14 horizontally extend from the duct connector 20. The duct 12 can be bent by an operator to a desired position. Even when horizontally mounted, the resiliency of the polymeric support 14 supports the weight of the flexible duct 12 so as to counterbalance this weight and fix the position of the duct 12. Just as in a vertical orientation, the opposite end 15 of the polymeric support 14 travels along the inner wall 17 of the flexible duct 12 when an operator bends the duct 12. The contact created between the inner wall 17 and the polymeric support 14 holds the duct in a fixed position.

Figure 3:
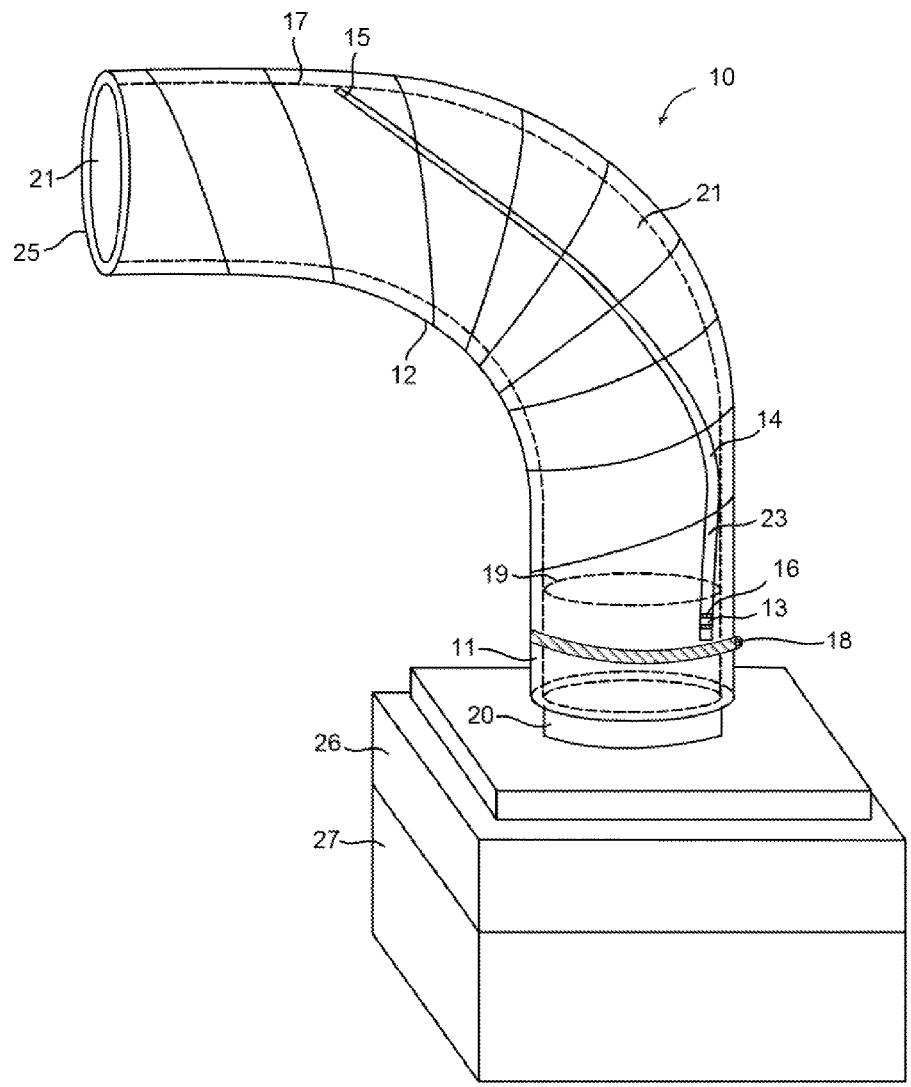
FIG. 3 shows a side elevation view of the apparatus of the present invention attached to a suction means.

Referring to FIG. 3, there is shown the apparatus 10 of the present invention with the duct connector 20 attached to a suction means 26. The suction means 26 is a vacuum device that uses an impeller or other vacuum technology to create a suction in the interior 21 of the flexible duct 12. The suction in the interior 21 of the flexible duct 12 causes harmful gases and particulate matter to be removed from the area just outside the opposite end 25 of the flexible duct. The harmful gases and particulate matter travel into the interior 21 and around the polymeric support 14, into the interior of the duct connector 20, through suction means 26, and through a filter 27 located at the discharge of the suction means 26. In this way, the air removed from the toxic area is filtered in close proximity to the area. Alternatively, the suction means 26 could be remotely located from the duct connector 20. For example, the duct connector 20 could be connected to another duct that takes the harmful gas and particulate matter to a suction means located outside a building or elsewhere. The gas and particulate matter are then discharged to a remote area that is less toxic and harmful to the people operating the apparatus 10.

Figure 4:
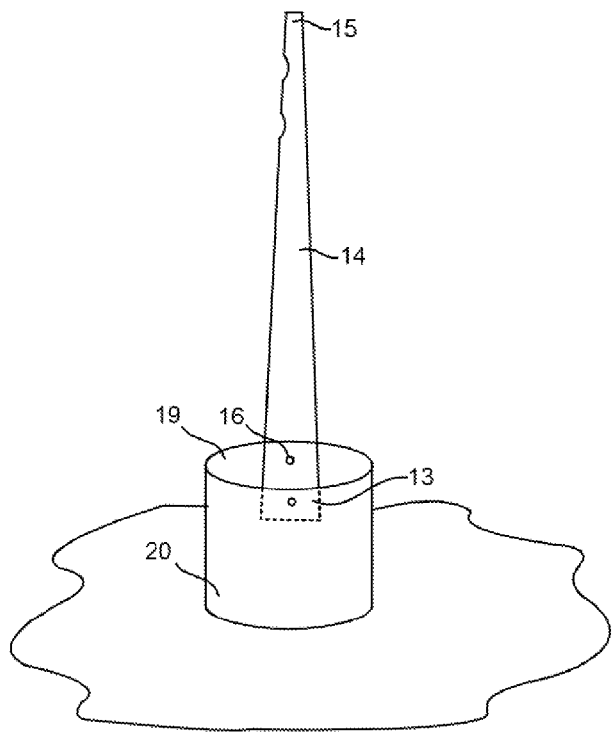
FIG. 4 shows a side elevational view of the polymeric support connected to the duct connector without flexible duct thereover.

Referring to FIG. 4, there is shown a view of the polymeric support 14 and duct connector 20 without the flexible duct 12 extending thereover. It can be more clearly seen that the end 13 of the polymeric support 14 is attached to the inner surface 19 of the duct support 20 by first anchoring means 16. With no flexible duct 12 exerting a downward force when bent, the polymeric support 14 has a resiliency that cause it to stand generally upright. Opposite end 15 of the polymeric support 14 extends away from the duct connector 20.

Figure 5:
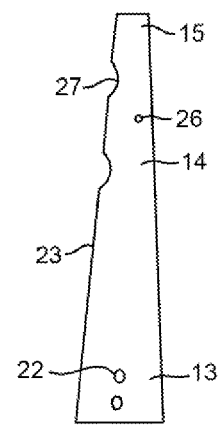
FIG. 5 shows a plan view of the polymeric support of the present invention.

Referring to FIG. 5, there is shown an isolated view of the polymeric support 14. As stated above, the polymeric support 14 is made of polycarbonate in the preferred embodiment. The end 13 of the polymeric support 14 constantly tapers toward the opposite end 15 thereof. The polymeric support 14 tapers because the taper makes the polymeric support 14 resiliently suitable for supporting a flexible duct (not shown). Some flexible ducts may be of a type where little or no taper is necessary. It is contemplated that the present inventions encompasses as little or as much taper as is necessary for the polymeric support 14 to support a flexible duct in a fixed position.

Experimentation on certain flexible ducts has shown that the necessary taper occurs when end 13 is wider than end 15. Experimentation has also revealed that notches 27 can be placed in the side 23 of the polymeric support 14 as part of its taper to enhance the resiliency of the polymeric support 14. Thus, the taper can includes notches 27 so as to make the polymeric support 14 more or less resilient for a given flexible duct 12. Other flexible ducts may or may not need such a taper and notches 27 or may require a different taper and notches. The present invention contemplates whatever taper is necessary to support a given flexible duct. Holes 22 are made in the end 13 of the polymeric support 14 so as to accommodate the bolts, screws or other fasteners of the first anchoring means 16.

Figure 6:
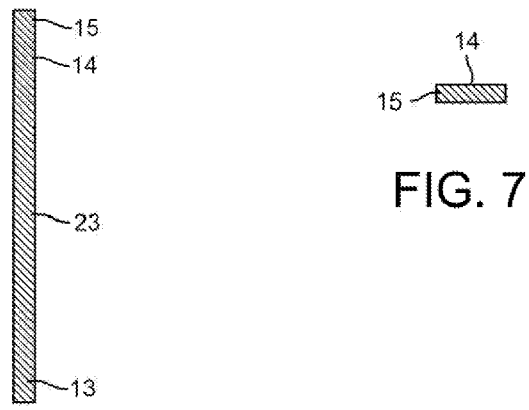
FIG. 6 shows a side view of the polymeric support of the present invention.

FIG. 6 shows the side 23 of the polymeric support 14. As can be seen the side 23 is of a generally constant thickness from end 13 to opposite end 15. The present invention also contemplates that there is a slight taper in thickness from end 13 to opposite end 15 so as to make the polymeric support 14 resiliently suitable for supporting a flexible duct 14.

Figure 7:
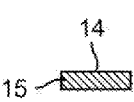
FIG. 7 shows an end view of the narrow end of the polymeric support of the present invention.

FIG. 7 shows an end view of the narrow end 15 of the polymeric support 14. The end 15 is generally rectangular in shape. It is contemplated that the end 15 could be a variety of shapes including oval or rectangular with curved edges.

Figure 8:
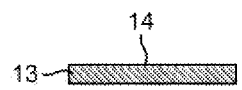
FIG. 8 shows an end view of the wide end of the polymeric support of the present invention.

FIG. 8 shows an end view of the wide end 13 of the polymeric support 14. Like the narrow end 15, the wide end 13 is rectangular in shape.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. An apparatus comprising:
    a duct connector having an outer wall and an inner wall;
    a flexible duct having an interior defined by an inner wall thereof, said flexible duct having a said inner wall thereof overlying said outer wall of said duct connector;
    a polymeric support having one end affixed to said inner wall of said duct connector, said polymeric support being an elongated member having a length dimension, said polymeric support having a substantial portion of said length dimension in spaced relation to said inner wall of said flexible duct, said polymeric support being bendable such that a portion of said polymeric support contacts said inner wall of said flexible duct at a location away from said duct connector when said flexible duct is bent in a direction toward said polymeric support so as to maintain said flexible duct in a fixed position.

2. The apparatus of claim 1, said polymeric support being tapered from a first end to a second end thereof.

3. The apparatus of claim 2, said polymeric support being of a polycarbonate material.

4. The apparatus of claim 2, said first end of said polymeric support being wider than said second end thereof, said first end being affixed to said duct connector.

5. The apparatus of claim 1, said duct connector having an outer diameter less than the inner diameter of said flexible duct.

6. An apparatus for extraction of gases, the apparatus comprising:
    a flexible duct having an interior defined by an inner wall thereof;
    a polymeric support extending within said interior of said flexible duct;
    a duct connector connected to one end of said flexible duct so as to communicate with said interior of said flexible duct, said polymeric support being an elongate member having one end affixed to said duct connector in spaced relation to said inner wall of said flexible duct, said polymeric support contacting said inner wall of said flexible duct at a location away from said duct connector so as to support said flexible duct in a curved configuration; and
    a suction means for drawing the gases through said flexible duct.

7. The apparatus of claim 6, said polymeric support being tapered from a first end to a second end, said first end being wider than said second end, said first end being adjacent said duct connector.

8. The apparatus of claim 7, said polymeric support being of a polycarbonate material.

9. The apparatus of claim 7, said polymeric support having at least one notch formed along an edge thereof, said polymeric support having a generally constant thickness from said first end to said second end.

10. The apparatus of claim 6, said duct connector having an outer diameter less than the inner diameter of said flexible duct.

11. An article for supporting a flexible duct in a fixed position, the article comprising:
    an elongate member formed of a polycarbonate material, said elongate member having a size suitable for fitting within an interior of the flexible duct, said elongate member being tapered from a first end to a second end thereof, said elongate member having at least one notch formed on an edge thereof in a location between said first end and said second end, said elongate member having a generally constant thickness; and
    an anchoring means connected for supporting said elongate member such that said elongate member contacts and inner wall of the flexible duct at a location spaced away from said first end of said elongate member.

12. The apparatus of claim 11, said anchoring means comprising:
    a ring member having a diameter suitable for fitting within the interior of the flexible duct; and
    a fastener affixed to said elongate support and to said ring member.

* * * * *